US011978397B2

(12) United States Patent
Seo et al.

(10) Patent No.: US 11,978,397 B2
(45) Date of Patent: May 7, 2024

(54) DISPLAY DEVICE

(71) Applicant: Samsung Display Co., Ltd., Yongin-si (KR)

(72) Inventors: Jungdeok Seo, Cheonan-si (KR); Yunseong Kim, Cheonan-si (KR); Sumin Lee, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/752,140

(22) Filed: May 24, 2022

(65) Prior Publication Data

US 2023/0069243 A1 Mar. 2, 2023

(30) Foreign Application Priority Data

Aug. 30, 2021 (KR) ........................ 10-2021-0114367

(51) Int. Cl.
*G09G 3/3233* (2016.01)
*G09G 3/3266* (2016.01)
*G09G 3/3283* (2016.01)

(52) U.S. Cl.
CPC ......... *G09G 3/3233* (2013.01); *G09G 3/3266* (2013.01); *G09G 3/3283* (2013.01); *G09G 2300/0842* (2013.01); *G09G 2320/0219* (2013.01); *G09G 2320/0233* (2013.01); *G09G 2320/045* (2013.01)

(58) Field of Classification Search
CPC .. G09G 3/3233; G09G 3/3266; G09G 3/3283; G09G 2300/0842; G09G 2320/0219; G09G 2320/0233; G09G 2320/045
See application file for complete search history.

(56) References Cited

U.S. PATENT DOCUMENTS

| | | | | |
|---|---|---|---|---|
| 9,236,011 | B2 * | 1/2016 | Mizukoshi | G09G 3/3233 |
| 9,761,178 | B2 | 9/2017 | Park et al. | |
| 10,152,942 | B2 * | 12/2018 | No | G09G 3/3611 |
| 10,380,947 | B2 * | 8/2019 | Fujii | H10K 59/1213 |
| 10,614,744 | B2 * | 4/2020 | Kim | G09G 3/2092 |
| 10,643,537 | B2 | 5/2020 | Kwon et al. | |
| 10,714,563 | B2 * | 7/2020 | Lee | H01L 27/1244 |
| 10,726,783 | B2 * | 7/2020 | Park | G09G 3/3233 |
| 11,158,262 | B2 * | 10/2021 | Gu | G09G 3/3611 |

(Continued)

FOREIGN PATENT DOCUMENTS

| | | |
|---|---|---|
| KR | 101349345 B1 | 1/2014 |
| KR | 1020160050166 A | 5/2016 |

(Continued)

*Primary Examiner* — Jeff Piziali

(74) *Attorney, Agent, or Firm* — CANTOR COLBURN LLP

(57) ABSTRACT

A display device includes a display panel including a plurality of pixels which display an image, a panel driver which generates a driving voltage based on a plurality of feedback voltages sensed from the display panel to drive the display panel, and a plurality of sensing lines which are connected to the pixels to sense the feedback voltages, respectively, and apply the sensed feedback voltages to the panel driver. The panel driver generates an average feedback voltage corresponding to an average of the feedback voltages and generates the driving voltage based on the average feedback voltage.

13 Claims, 10 Drawing Sheets

(56) References Cited

U.S. PATENT DOCUMENTS

| | | | | |
|---|---|---|---|---|
| 2013/0162622 | A1* | 6/2013 | Ebisuno | G09G 3/3611 |
| 2013/0241808 | A1* | 9/2013 | Kwon | G05F 1/24<br>323/284 |
| 2016/0086542 | A1* | 3/2016 | Lee | G09G 3/3225<br>345/212 |
| 2016/0117992 | A1* | 4/2016 | Park | G09G 3/3275<br>345/76 |
| 2017/0193959 | A1* | 7/2017 | No | G09G 3/3611 |
| 2018/0190196 | A1* | 7/2018 | Kwon | H10K 59/35 |

FOREIGN PATENT DOCUMENTS

| | | | |
|---|---|---|---|
| KR | 1020180058950 | A | 6/2018 |
| KR | 1020180078935 | A | 7/2018 |
| KR | 1020200017112 | A | 2/2020 |

* cited by examiner

DISPLAY DEVICE

This application claims priority to Korean Patent Application No. 10-2021-0114367, filed on Aug. 30, 2021, and all the benefits accruing therefrom under 35 U.S.C. § 119, the content of which in its entirety is herein incorporated by reference.

BACKGROUND

1. Field

Embodiments relate to a display device, and more particularly relate to a display device with improved display quality of a display area thereof.

2. Description of the Related Art

A display device includes various electronic components, such as a display panel displaying an image, an input sensing unit sensing an external input, and an electronic module. The electronic components are electrically connected to each other by signal lines arranged in various manners. The display panel includes pixels. Each of the pixels includes a light-emitting element emitting a light and a circuit unit controlling an amount of current flowing through the light-emitting element.

SUMMARY

When a leakage current occurs in a circuit unit of a pixel, an amount of a current flowing through a light-emitting element is changed, and as a result, a display quality of a display panel is deteriorated.

Embodiments of the invention provide a display device capable of reducing a difference in brightness and improving a display quality.

An embodiment of the invention provides a display device including a display panel including a plurality of pixels displaying an image, a panel driver generating a driving voltage based on a plurality of feedback voltages sensed from the display panel and driving the display panel, and a plurality of sensing lines connected to the plurality of pixels to sense the plurality of feedback voltages, respectively, and applying the plurality of feedback voltages to the panel driver. The panel driver generates an average feedback voltage corresponding to an average of the plurality of feedback voltages and generates the driving voltage based on the average feedback voltage.

In an embodiment, the panel driver may include a controller generating a source control signal and a gate control signal and generating image data based on an image signal applied thereto from an outside, a data driver receiving the image data and the source control signal, generating a data signal based on the image data, and applying the data signal to the display panel, and a scan driver including a plurality of scan lines, generating a scan signal based on the gate control signal, and sequentially transmitting the scan signal to the display panel via the plurality of scan lines.

In an embodiment, the plurality of pixels may include a plurality of upper pixels and a plurality of lower pixels. The plurality of lower pixels may be closer to the panel driver than the plurality of upper pixels is to the panel driver. The plurality of sensing lines may include a plurality of upper sensing lines connected to the plurality of upper pixels and a plurality of lower sensing lines connected to the plurality of lower pixels.

In an embodiment, the plurality of upper pixels may include a first upper pixel and a second upper pixel disposed farthest from the first upper pixel in a first direction, the plurality of lower pixels may include a first lower pixel and a second lower pixel disposed farthest from the first lower pixel in the first direction, the plurality of upper sensing lines may include a first upper sensing line connected to the first upper pixel and a second upper sensing line connected to the second upper pixel, and the plurality of lower sensing lines may include a first lower sensing line connected to the first lower pixel and a second lower sensing line connected to the second lower pixel.

In an embodiment, the plurality of feedback voltages may include a first upper feedback voltage sensed from the first upper sensing line, a second upper feedback voltage sensed from the second upper sensing line, a first lower feedback voltage sensed from the first lower sensing line, and a second lower feedback voltage sensed from the second lower sensing line.

In an embodiment, the average feedback voltage may include an upper average feedback voltage of the first upper feedback voltage and the second upper feedback voltage and a lower average feedback voltage of the first lower feedback voltage and the second lower feedback voltage.

In an embodiment, the driving voltage may increase linearly between the upper average feedback voltage and the lower average feedback voltage along a scan direction of the scan signal proceeding from the plurality of upper pixels to the plurality of lower pixels with respect to one frame.

In an embodiment, the panel driver may further include a brightness compensator, and the brightness compensator may include a feedback voltage generator calculating an average of the plurality of feedback voltages from the plurality of sensing lines and generating the average feedback voltage and a driving voltage generator generating the driving voltage based on the average feedback voltage.

In an embodiment, the brightness compensator may further include a compensation voltage generator, and the compensation voltage generator may generate a compensation voltage based on the generated driving voltage and apply the compensation voltage to the display panel.

In an embodiment, the compensation voltage may be linearly changed with a constant gap with respect to the driving voltage in response to the scan signal.

In an embodiment, a driving voltage of an n-th scan line among the plurality of scan lines may be determined by a following Equation of:

$$VCS_n = VFB_{UP} + \frac{VFB_{DN} - VFB_{UP}}{V_{total}} \times V_n.$$

In an embodiment, the driving voltage applied to the display panel may decrease linearly from a lower side of the display panel to an upper side of the display panel. The lower side of the display panel may be closer to the panel driver than the upper side of the display panel is to the panel driver.

In an embodiment, the driving voltage applied to the plurality of lower pixels of the display panel may be greater than the driving voltage applied to the plurality of upper pixels of the display panel.

An embodiment of the invention provides a display device including a display panel including a plurality of pixels displaying an image and including a plurality of upper pixels disposed at an upper side of the display panel and a plurality of lower pixels disposed at a lower side of the display panel, a plurality of sensing lines sensing a plurality of feedback voltages based on an initial driving voltage applied to the plurality of pixels, and a panel driver generating a driving voltage based on the plurality of feedback voltages and driving the display panel. The plurality of pixels includes a plurality of upper pixels disposed at an upper side of the display panel and a plurality of lower pixels disposed at a lower side of the display panel. The upper side of the display pane is farther from the panel driver than the lower side of the display panel is from the panel driver in a direction in which the initial driving voltage is applied. The driving voltage decreases linearly from the lower side of the display panel to the upper side of the display panel.

In an embodiment, the plurality of feedback voltages may include upper feedback voltages sensed from the plurality of upper pixels and lower feedback voltages sensed from the plurality of lower pixels, and the panel driver may calculate an average of the upper feedback voltages to generate an upper average feedback voltage and calculate an average of the lower feedback voltages to generate a lower average feedback voltage.

In an embodiment, the driving voltage may increase linearly from the upper average feedback voltage as a minimum voltage to the lower average feedback voltage as a maximum voltage.

In an embodiment, the panel driver may include a brightness compensator to compensate for a difference in brightness between the upper side of the display panel and the lower side of the display panel, and the brightness compensator may generate a compensation voltage that decreases from the lower side of the display panel to the upper side of the display panel while maintaining a constant voltage gap with the driving voltage based on the driving voltage.

In an embodiment, the driving voltage may increase linearly from a first scan period of the plurality of upper pixels to a second scan period of the plurality of lower pixels in one frame, and the increase of the driving voltage in the one frame from the first scan period to the second scan period may be repeated in every frame.

In an embodiment, the plurality of sensing lines may include an upper sensing line connected to the plurality of upper pixels and a lower sensing line connected to the plurality of lower pixels.

In an embodiment, the display panel may include a display area through which an image is displayed and a non-display area defined adjacent to the display area, the plurality of upper pixels and the plurality of lower pixels may be disposed in the display area, and the upper sensing line and the lower sensing line may be disposed in the non-display area.

According to the above, the display device applies the driving voltage that is linearly changed based on the feedback voltage to the display panel, and thus, a brightness difference of the display device is reduced.

BRIEF DESCRIPTION OF THE DRAWINGS

The above and other advantages of the invention will become readily apparent by reference to the following detailed description when considered in conjunction with the accompanying drawings, in which.

DETAILED DESCRIPTION

Figure 1:
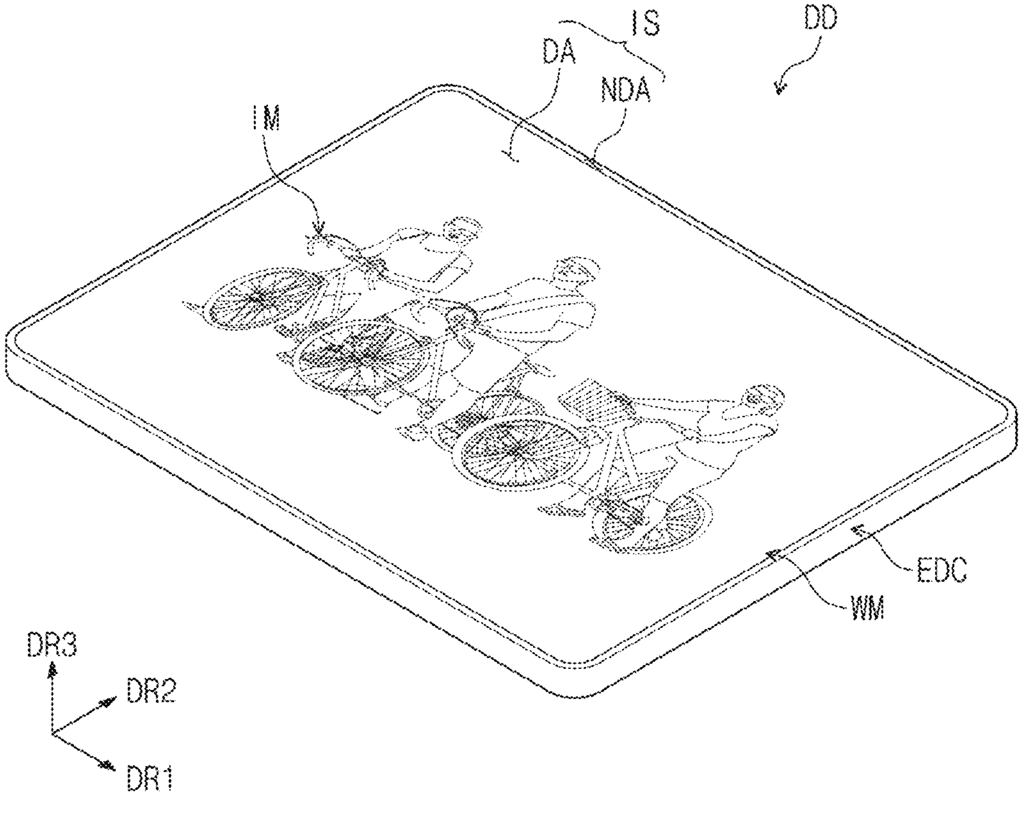
FIG. 1 is a perspective view showing an embodiment of a display device according to the invention.

In the disclosure, it will be understood that when an element (or area, layer, or portion) is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content. As used herein, the term "and/or" includes any and all combinations of one or more of the associated listed items.

It will be understood that, although the terms first, second, etc., may be used herein to describe various elements, these elements should not be limited by these terms. These terms are only used to distinguish one element from another element. Thus, a first element discussed below could be termed a second element without departing from the teachings of the disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the drawing figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 2:
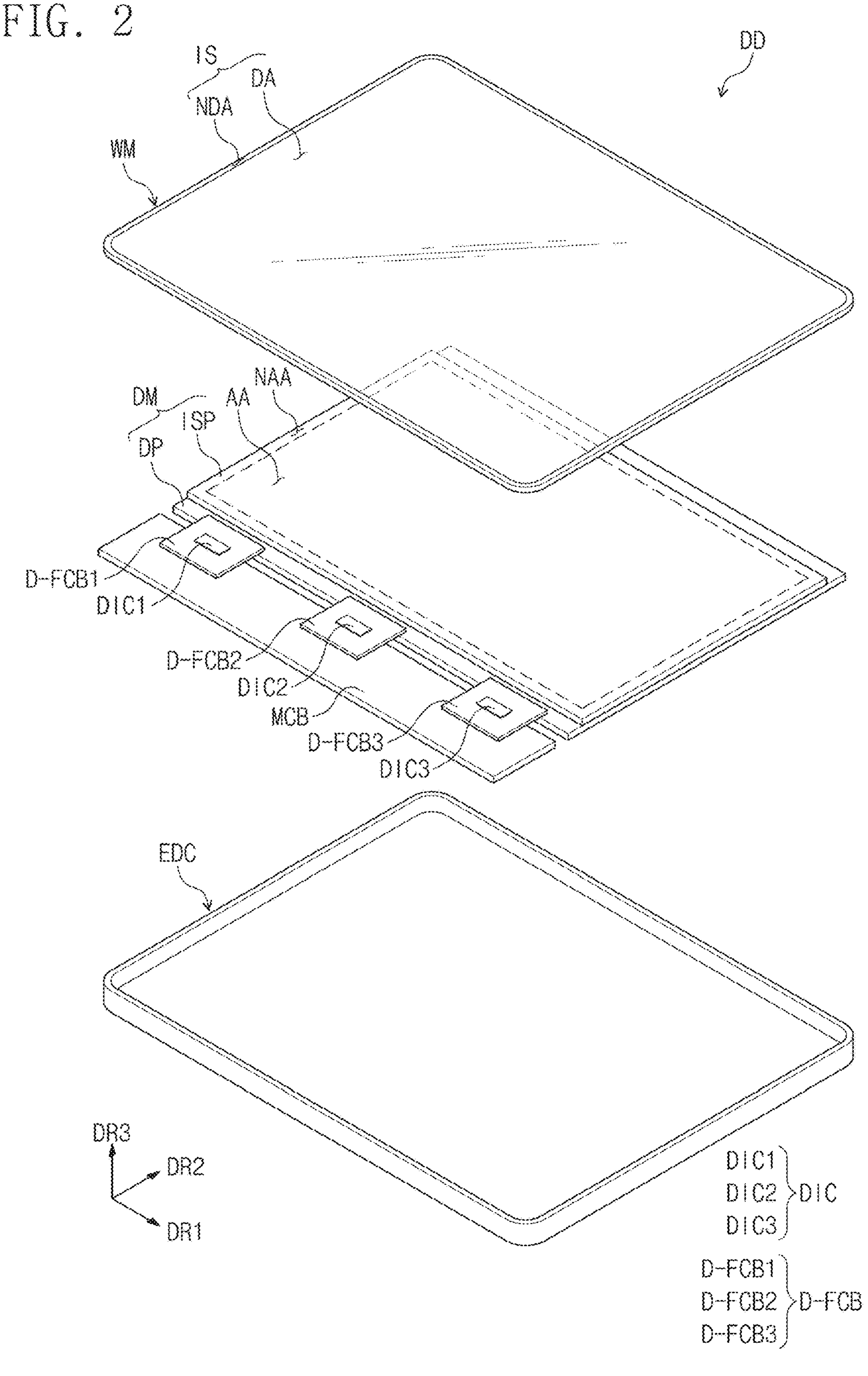
FIG. 2 is an exploded perspective view showing the display device shown in FIG. 1.

FIG. 1 is a perspective view showing an embodiment of a display device DD in an embodiment of the invention, and FIG. 2 is an exploded perspective view showing the display device DD shown in FIG. 1.

Referring to FIGS. 1 and 2, the display device DD may be a device activated in response to an electrical signal. The display device DD may be applied to a large-sized display device, such as a television set or a monitor, and a small and medium-sized display device, such as a mobile phone, a tablet computer, a notebook computer, a car navigation unit, or a game unit. However, these are merely examples, and the display device DD may be applied to other electronic devices as long as they do not depart from the concept of the invention. The display device DD may have a quadrangular (e.g., rectangular) shape defined by long sides extending in a first direction DR1 and short sides extending in a second direction DR2 crossing the first direction DR1. However, the shape of the display device DD should not be limited to the quadrangular (e.g., rectangular) shape, and the display device DD may have a variety of shapes. The display device DD may display an image IM toward a third direction DR3 through a display surface IS that is substantially parallel to each of the first direction DR1 and the second direction DR2. The display surface IS through which the image IM is displayed may correspond to a front surface of the display device DD.

In the illustrated embodiment, front (or upper) and rear (or lower) surfaces of each member are defined with respect to the direction in which the image IM is displayed. The front and rear surfaces are opposite to each other in the third direction DR3, and a normal line direction of each of the front and rear surfaces may be substantially parallel to the third direction DR3.

A separation distance in the third direction DR3 between the front surface and the rear surface may correspond to a thickness in the third direction DR3 of the display device DD. Directions indicated by the first, second, and third directions DR1, DR2, and DR3 may be relative each other and may be changed to other directions.

The display device DD may sense an external input applied thereto from the outside. The external input may include various forms of inputs provided from the outside of the display device DD. The display device DD in an embodiment of the invention may sense an external input applied thereto from the outside by a user. The external input by the user may include one of various forms of external inputs, such as a portion of the user's body, light, heat, gaze, or pressure, or any combinations thereof. In addition, the display device DD may sense the external input by the user applied to a side or rear surface thereof depending on a structure of the display device DD, and the invention should not be limited to a particular embodiment. In an embodiment, the external input may include inputs generated by an input device, e.g., a stylus pen, an active pen, a touch pen, an electronic pen, an e-pen, or the like.

The display surface IS of the display device DD may include a display area DA and a non-display area NDA. The display area DA may be an area through which the image IM is displayed. The user may view the image IM through the display area DA. In the illustrated embodiment, the display area DA may have a quadrangular shape with rounded vertices, however, this is merely one of embodiments. The display area DA may have a variety of shapes and should not be particularly limited.

The non-display area NDA may be defined adjacent to the display area DA. The non-display area NDA may have a predetermined color. The non-display area NDA may surround the display area DA. Accordingly, the display area DA may have a shape defined by the non-display area NDA, however, this is merely one of embodiments. In an embodiment, the non-display area NDA may be disposed adjacent to only one side of the display area DA or may be omitted. The display device DD may include various embodiments and should not be particularly limited.

As shown in FIG. 2, the display device DD may include a display module DM and a window WM disposed on the display module DM. The display module DM may include a display panel DP and an input sensing layer ISP.

In an embodiment, the display panel DP may be a light-emitting type display panel. In an embodiment, the display panel DP may be an organic light-emitting display panel, an inorganic light-emitting display panel, or a quantum dot light-emitting display panel. A light-emitting layer of the organic light-emitting display panel may include an organic light-emitting material. A light-emitting layer of the inorganic light-emitting display panel may include an inorganic light-emitting material. A light-emitting layer of the quantum dot light-emitting display panel may include a quantum dot or a quantum rod. Hereinafter, the organic light-emitting display panel will be described as the display panel DP.

The display panel DP may output the image IM, and the output image IM may be displayed through the display surface IS.

The input sensing layer ISP may be disposed on the display panel DP to sense the external input. The input sensing layer ISP may be disposed directly on the display panel DP. In an embodiment, the input sensing layer ISP may be formed or disposed on the display panel DP through successive processes. That is, when the input sensing layer ISP is disposed directly on the display panel DP, an inner adhesive film (not shown) may not be disposed between the input sensing layer ISP and the display panel DP. However, the invention is not limited thereto, and the inner adhesive film may be disposed between the input sensing layer ISP and the display panel DP. In this case, the input sensing layer ISP is not manufactured together with the display panel DP through the successive processes. That is, the input sensing layer ISP may be fixed to an upper surface of the display panel DP by the inner adhesive film after being manufactured through a separate process from the display panel DP.

The window WM may include a transparent material that transmits the image IM. In an embodiment, the window WM may include a glass, sapphire, or plastic material. The window WM may have a single-layer structure, however, it should not be limited thereto or thereby, and the window WM may include a plurality of layers.

Although not shown in drawing figures, the non-display area NDA of the display device DD may be defined by printing a material having a predetermined color on an area of the window WM. In an embodiment, the window WM may include a light-blocking pattern to define the non-display area NDA. The light-blocking pattern may be a colored organic layer and may be formed or provided by a coating method.

The window WM may be coupled with the display module DM by an adhesive film. In an embodiment, the adhesive film may include an optically clear adhesive ("OCA") film. However, the adhesive film should not be limited thereto or thereby, and the adhesive film may include an ordinary adhesive. In an embodiment, the adhesive film may include an optically clear resin ("OCR") or a pressure sensitive adhesive ("PSA") film, for example.

An anti-reflective layer may be further disposed between the window WM and the display module DM. The anti-reflective layer may reduce a reflectance with respect to an external light incident thereto from the above of the window WM. In an embodiment of the invention, the anti-reflective layer may include a retarder and a polarizer. The retarder may be a film type or liquid crystal coating type and may include a 212 retarder and/or a 214 retarder. The polarizer may be a film type or liquid crystal coating type. The film type retarder and the film type polarizer may include a stretching type synthetic resin film, and the liquid crystal coating type retarder and the liquid crystal coating type polarizer may include liquid crystals aligned in a predetermined alignment. The retarder and the polarizer may be implemented as one polarizing film.

In an embodiment, the anti-reflective layer may include color filters. Arrangements of the color filters may be determined by taking into account colors of lights generated by a plurality of pixels PX (refer to FIG. 3) included in the display panel DP. The anti-reflective layer may further include a light-blocking pattern.

The display module DM may display the image in response to electrical signals and may transmit/receive information on the external input. The display module DM may include an effective area AA and a non-effective area NAA. The effective area AA may be defined as an area through which the image IM provided from the display module DM transmits. In addition, the effective area AA may be defined as an area in which the input sensing layer ISP senses the external input from the outside.

The non-effective area NAA may be defined adjacent to the effective area AA. In an embodiment, the non-effective area NAA may surround the effective area AA. However, this is merely one of embodiments, and the non-effective area NAA may be defined in various shapes and should not be particularly limited. In an embodiment, the effective area AA of the display module DM may correspond to at least a portion of the display area DA.

The display module DM may further include a main circuit board MCB, a plurality of flexible circuit films D-FCB, and a plurality of driving chips DIC. The main circuit board MCB may be connected to the flexible circuit films D-FCB and may be electrically connected to the display panel DP. The flexible circuit films D-FCB may be connected to the display panel DP and may electrically connect the display panel DP to the main circuit board MCB. The main circuit board MCB may include a plurality of driving elements. The driving elements may include a circuit to drive the display panel DP. The driving chips DIC may be disposed (e.g., mounted) on the flexible circuit films D-FCB.

In an embodiment, the flexible circuit films D-FCB may include a first flexible circuit film D-FCB1, a second flexible circuit film D-FCB2, and a third flexible circuit film D-FCB3. The driving chips DIC may include a first driving chip DIC1, a second driving chip DIC2, and a third driving chip DIC3. In this case, the first, second, and third flexible circuit films D-FCB1, D-FCB2, and D-FCB3 may be spaced apart from each other in the first direction DR1 and may be connected to the display panel DP to electrically connect the display panel DP and the main circuit board MCB. The first driving chip DIC1 may be disposed (e.g., mounted) on the first flexible circuit film D-FCB1. The second driving chip DIC2 may be disposed (e.g., mounted) on the second flexible circuit film D-FCB2. The third driving chip DIC3 may be disposed (e.g., mounted) on the third flexible circuit film D-FCB3. However, the invention should not be limited thereto or thereby. In an embodiment, the display panel DP may be electrically connected to the main circuit board MCB via one flexible circuit film, and only one driving chip may be disposed (e.g., mounted) on the one flexible circuit film. In addition, the display panel DP may be electrically connected to the main circuit board MCB via four or more flexible circuit films, and driving chips may be respectively disposed (e.g., mounted) on the flexible circuit films.

FIG. 2 shows a structure in which the first, second, and third driving chips DIC1, DIC2, and DIC3 are respectively disposed (e.g., mounted) on the first, second, and third flexible circuit films D-FCB1, D-FCB2, and D-FCB3, however, the invention should not be limited thereto or thereby. In an embodiment, the first, second, and third driving chips DIC1, DIC2, and DIC3 may be directly disposed (e.g., mounted) on the display panel DP. In this case, portions of the display panel DP on which the first, second, and third driving chips DIC1, DIC2, and DIC3 are disposed (e.g., mounted) may be bent to be disposed on a rear surface of the display module DM. In addition, the first, second, and third driving chips DIC1, DIC2, and DIC3 may be directly disposed (e.g., mounted) on the main circuit board MCB.

The input sensing layer ISP may also be electrically connected to the main circuit board MCB via the flexible circuit films D-FCB, however, the invention should not be limited thereto or thereby. That is, the display module DM may further include a separate flexible circuit film to electrically connect the input sensing layer ISP to the main circuit board MCB.

The display device DD may further include an external case EDC accommodating the display module DM. The external case EDC may be coupled with the window WM to define an appearance of the display device DD. The external case EDC may absorb impacts applied thereto from the outside and may prevent foreign substance and moisture from entering the display module DM to protect components accommodated in the external case EDC. In an embodiment, the external case EDC may be provided in a form in which a plurality of storage members is combined with each other.

In an embodiment, the display device DD may further include an electronic module including various functional modules to operate the display module DM, a power supply module supplying a power desired for an overall operation of the display device DD, and a bracket coupled to the display module DM and/or the external case EDC to divide an inner space of the display device DD.

Figure 3:
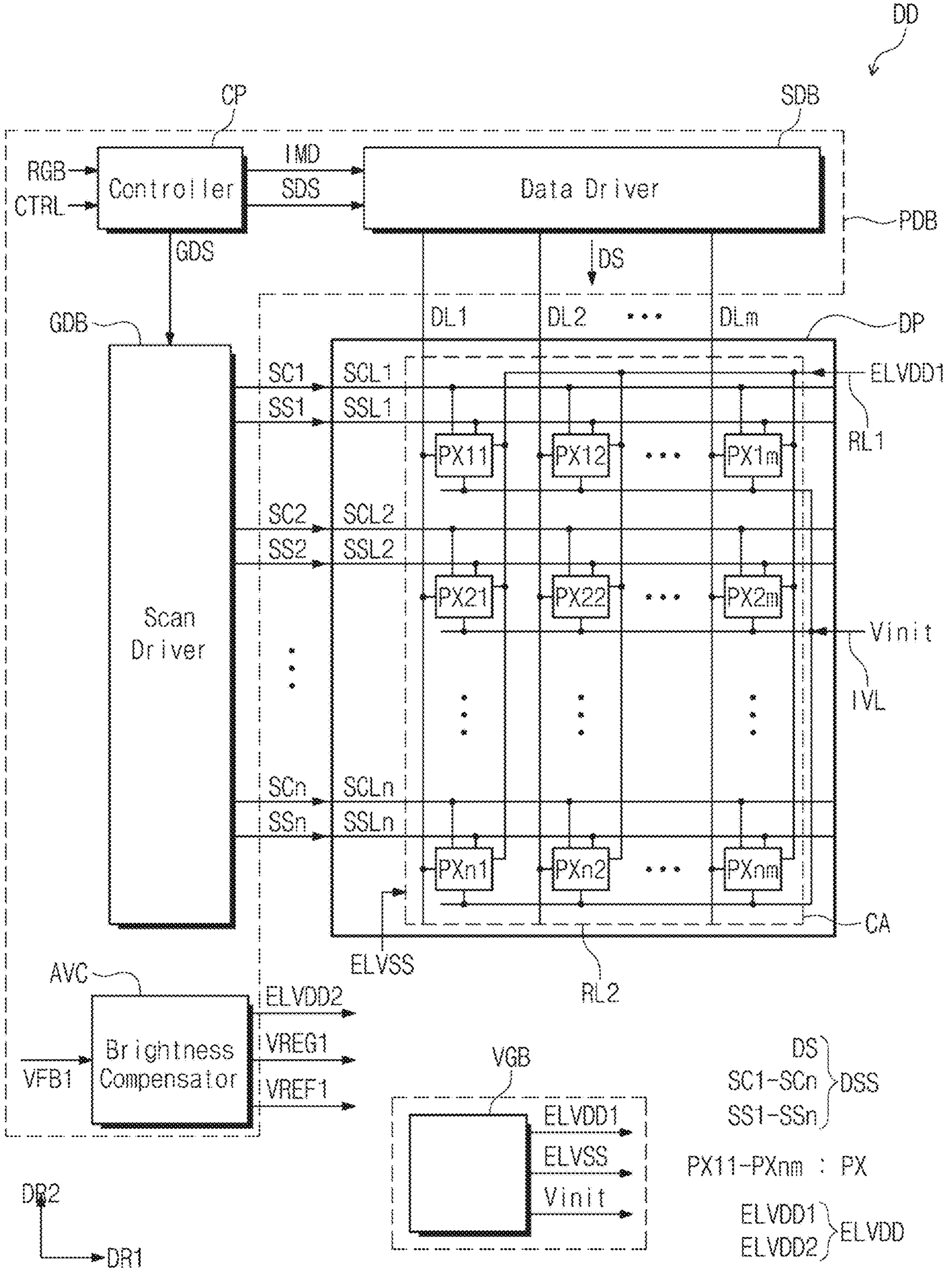
FIG. 3 is a block diagram showing an embodiment of a display device according to the invention.

FIG. 3 is a block diagram showing an embodiment of the display device DD according to the invention.

Referring to FIG. 3, the display device DD may include the display panel DP, a panel driver PDB, and a voltage generator VGB.

In an embodiment, the panel driver PDB may include a controller CP, a data driver SDB, a scan driver GDB, and a brightness compensator AVC.

The controller CP may receive image signals RGB and an external control signal CTRL from the outside. The controller CP may convert a data format of the image signals RGB to a data format appropriate to an interface between the data driver SDB and the controller CP to generate image data IMD. The controller CP may generate a source control signal SDS and a gate control signal GDS based on the image signals RGB and the external control signal CTRL. The external control signal CTRL may include a vertical synchronization signal Vsync (refer to FIG. 7), a horizontal synchronization signal, a main clock, or the like.

The controller CP may transmit the image data IMD and the source control signal SDS to the data driver SDB and may transmit the gate control signal GDS to the scan driver GDB. The panel driver PDB may generate a driving signal DSS to drive the display panel DP based on the source control signal SDS and the gate control signal GDS. In an embodiment, the driving signal DSS may include a data signal DS, scan signals SC1 to SCn, and initialization signals SS1 to SSn. Here, n may be a natural number.

The data driver SDB may receive the image data IMD and the source control signal SDS from the controller CP. The source control signal SDS may include a horizontal start signal starting an operation of the data driver SDB. The data driver SDB may generate the data signal DS based on the image data IMD in response to the source control signal SDS. The data driver SDB may output the data signal DS to a plurality of data lines DL1 to DLm described later. Here, m may be a natural number. The data signal DS may be an analog voltage corresponding to a gray scale value of the image data IMD.

The scan driver GDB may receive the gate control signal GDS from the controller CP. The gate control signal GDS may include a vertical start signal starting an operation of the scan driver GDB and a scan clock signal determining an output timing of the scan signals SC1 to SCn and the initialization signals SS1 to SSn. The scan driver GDB may generate the scan signals SC1 to SCn and the initialization signals SS1 to SSn based on the gate control signal GDS. The scan driver GDB may sequentially output the scan signals SC1 to SCn to a plurality of scan lines SCL1 to SCLn described later and may sequentially output the initialization signals SS1 to SSn to a plurality of initialization lines SSL1 to SSLn described later.

In an embodiment, the scan signals SC1 to SCn may be sequentially applied to a first scan line SCL1 to an n-th scan line SCLn, which is the last line. The first scan line SCL1 may be disposed at an uppermost side UP (hereinafter, also referred to as an upper side UP, refer to FIG. 5) of the display panel DP in the second direction DR2, and the n-th scan line SCLn may be disposed at a lowermost side DN (hereinafter, also referred to as a lower side DN, refer to FIG. 5) of the display panel DP in the second direction DR2. That is, in the illustrated embodiment, the scan signals SC1 to SCn may be sequentially applied from the upper side UP (refer to FIG. 5) to the lower side DN (refer to FIG. 5) of the display panel DP in one frame FR (refer to FIG. 7).

The voltage generator VGB may generate voltages desired for the operation of the display panel DP. In an embodiment, the voltage generator VGB may generate initial driving voltages. In an embodiment, the voltage generator VGB may generate a first driving voltage ELVDD, a second driving voltage ELVSS, and an initialization voltage Vinit.

In an embodiment, the display panel DP may include the scan lines SCL1 to SCLn, the initialization lines SSL1 to SSLn, the data lines DL1 to DLm, and a plurality of pixels PX11 to PXnm. The scan lines SCL1 to SCLn and the initialization lines SSL1 to SSLn may extend in the first direction DR1 from the scan driver GDB and may arranged in the second direction DR2 to be spaced apart from each other. The data lines DL1 to DLm may extend in a direction opposite to the second direction DR2 from the data driver SDB and may be arranged in the first direction DR1 to be spaced apart from each other.

Each of the pixels PX11 to PXnm may be electrically connected to a corresponding scan line among the scan lines SCL1 to SCLn and a corresponding initialization line among the initialization lines SSL1 to SSLn. In addition, each of the pixels PX11 to PXnm may be electrically connected to a corresponding data line among the data lines DL1 to DLm.

Each of the pixels PX11 to PXnm may be electrically connected to a first power line RL1, a second power line RL2, and an initialization power line IVL. The first power line RL1 may receive the first driving voltage ELVDD. The second power line RL2 may receive the second driving voltage ELVSS. The initialization power line IVL may receive the initialization voltage Vinit. In an embodiment, the second power line RL2 may be disposed to overlap two or more pixels.

The pixels PX11 to PXnm may include a plurality of groups including organic light-emitting diodes emitting color lights different from each other. In an embodiment, the pixels PX11 to PXnm may include red pixels emitting a red color light, green pixels emitting a green color light, and blue pixels emitting a blue color light. The organic light-emitting diode of the red pixel, the organic light-emitting diode of the green pixel, and the organic light-emitting diode of the blue pixel may include different light-emitting materials from each other.

The brightness compensator AVC may compensate for a brightness difference generated in the display panel DP. In an embodiment, the brightness compensator AVC may compensate for the brightness difference generated between the upper side UP and the lower side DN of the display panel DP.

In an embodiment, the brightness of upper pixels PX11 to PX1*m* disposed at the upper side UP of the display panel DP may be smaller than the brightness of lower pixels PXn1 to PXnm disposed at the lower side DN of the display panel DP. Since the upper pixels PX11 to PX1*m* are disposed farther away from the voltage generator VGB than the lower pixels PXn1 to PXnm are from the voltage generator VGB, the brightness difference may occur due to a voltage drop (an "IR" drop). The first driving voltage ELVDD1 that is the initial driving voltage applied to the display panel DP from the voltage generator VGB may be applied first to the lower pixels PXn1 to PXnm, which are disposed near the voltage generator VGB, and finally applied to the upper pixels PX11 to PX1*m* after advancing upward, and in this process, the IR drop may occur due to line resistance and current.

The brightness compensator AVC may apply a compensation voltage to the upper side UP of the display panel DP, which is lower than a compensation voltage applied to the lower side DN, and thus, the brightness difference may be compensated for. The compensation voltage may correspond to the data voltage applied to the pixels. Details thereof will be described later.

Figure 4:
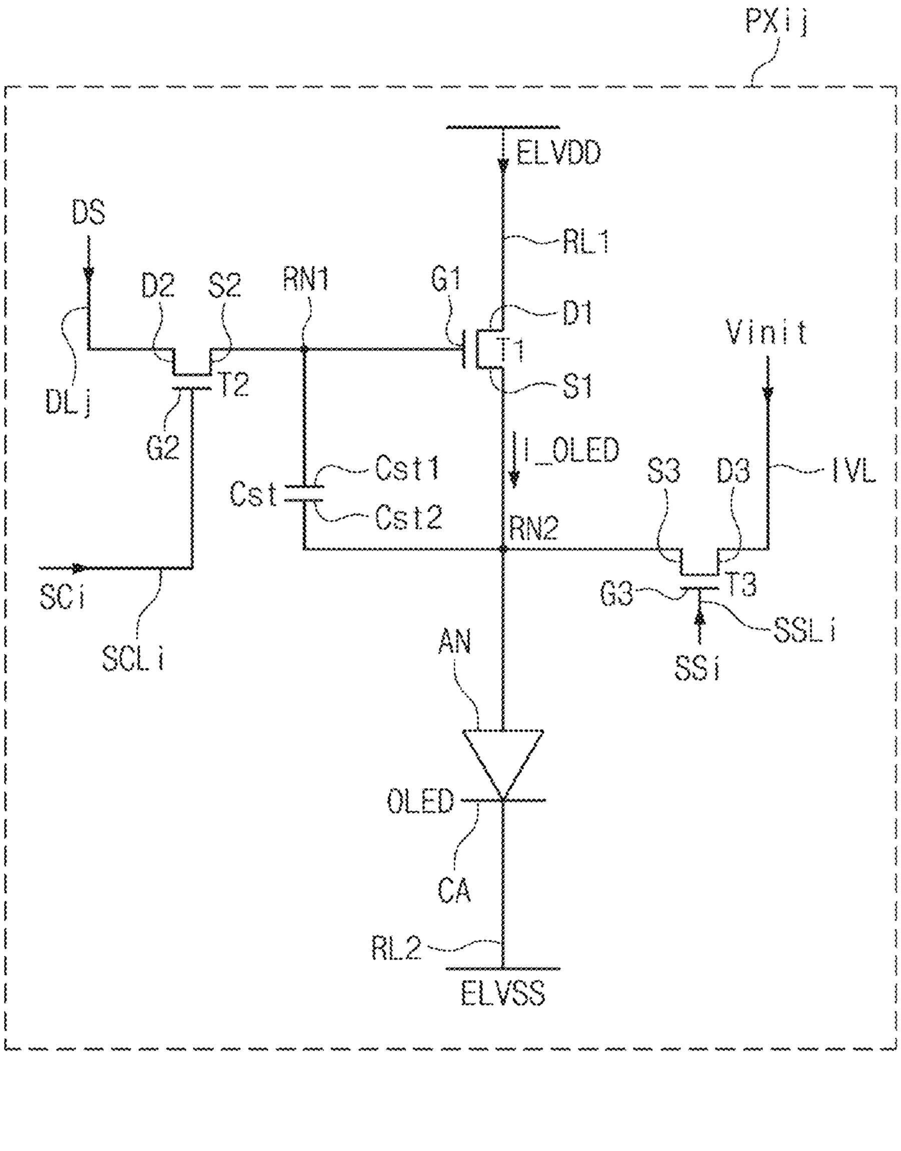
FIG. 4 is an equivalent circuit diagram showing an embodiment of a pixel according to the invention.

FIG. 4 is an equivalent circuit diagram showing an embodiment of a pixel PXij according to the invention. Here, i may be a natural number equal to or less than n, and j may be a natural number equal to or less than m.

Referring to FIG. 4, the pixel PXij connected to an i-th scan line SCLi among the scan lines SCL1 to SCLn, an i-th initialization line SSLi among the initialization lines SSL1 to SSLn, and a j-th data line DLj among the data lines DL1 to DLm is shown as an illustrated embodiment.

In an embodiment, the pixel PXij may include first, second, and third transistors T1, T2, and T3, a capacitor Cst, and a light-emitting diode OLED. In the illustrated embodiment, each of the first, second, and third transistors T1, T2, and T3 will be described as an N-type transistor, however, the invention should not be limited thereto or thereby. Each of the first, second, and third transistors T1, T2, and T3 may be implemented as a P-type transistor or the N-type transistor. In the disclosure, the expression "a transistor is connected to a signal line" means that one electrode of a source electrode, a drain electrode, and a gate electrode of the transistor is provided integrally with the signal line or connected to the signal line via a connection electrode. In addition, the expression "a transistor is electrically connected to another transistor" means that one electrode of a source electrode, a drain electrode, and a gate electrode of the transistor is provided integrally with one electrode of a source electrode, a drain electrode, a gate electrode of another transistor or connected to one electrode of the source electrode, the drain electrode, the gate electrode of another transistor via a connection electrode.

In the illustrated embodiment, the first transistor T1 may be a driving transistor, and the second transistor T2 may be a switching transistor. The third transistor T3 may be an initialization transistor. Hereinafter, each of the first to third transistors T1 to T3 may include a first electrode, a second electrode, and a control electrode, the first electrode may be also referred to as a source electrode, the second electrode may be also referred to as a drain electrode, and the control electrode may be also referred to as a gate electrode.

The first transistor T1 may be connected between the first power line RL1 and the light-emitting diode OLED. A source electrode S1 of the first transistor T1 may be electrically connected to an anode AN of the light-emitting diode OLED. A drain electrode D1 of the first transistor T1 may be electrically connected to the first power line RL1. A gate electrode G1 of the first transistor T1 may be electrically connected to a first reference node RN1. The first reference node RN1 may be a node that is electrically connected to a source electrode S2 of the second transistor T2. In an embodiment, the first driving voltage ELVDD may be applied to the drain electrode D1 of the first transistor T1 via the first power line RL1.

The second transistor T2 may be connected between the j-th data line DLj and the gate electrode G1 of the first transistor T1. The source electrode S2 of the second transistor T2 may be electrically connected to the gate electrode G1 of the first transistor T1. A drain electrode D2 of the second transistor T2 may be electrically connected to the j-th data line DLj. A gate electrode G2 of the second transistor T2 may be electrically connected to the i-th scan line SCLi. In an embodiment, an i-th scan signal SCi may be applied to the gate electrode G2 of the second transistor T2 via the i-th scan line SCLi. The data signal DS may be applied to the drain electrode D2 of the second transistor T2 via the j-th data line DLj.

The third transistor T3 may be connected between a second reference node RN2 and the initialization power line IVL. A source electrode S3 of the third transistor T3 may be electrically connected to the second reference node RN2. The second reference node RN2 may be a node that is electrically connected to the source electrode S1 of the first transistor T1. In addition, the second reference node RN2 may be a node that is electrically connected to the anode AN of the light-emitting diode OLED. A drain electrode D3 of the third transistor T3 may be electrically connected to the initialization power line IVL. A gate electrode G3 of the third transistor T3 may be electrically connected to the i-th initialization line SSLi. In an embodiment, an i-th initialization signal SSi may be applied to the gate electrode G3 of the third transistor T3 via the i-th initialization line SSLi. The initialization voltage Vinit may be applied to the drain electrode D3 of the third transistor T3 via the initialization power line IVL.

The light-emitting diode OLED may be connected between the second reference node RN2 and the second power line RL2. The anode AN of the light-emitting diode OLED may be electrically connected to the second reference node RN2. A cathode CA of the light-emitting diode OLED may be electrically connected to the second power line RL2.

The capacitor Cst may be connected between the first reference node RN1 and the second reference node RN2. A first electrode Cst1 of the capacitor Cst may be electrically connected to the first reference node RN1, and a second electrode Cst2 of the capacitor Cst may be electrically connected to the second reference node RN2.

Referring to FIG. 3, the scan driver GDB may sequentially apply the scan signals SC1 to SCn and the initialization signals SS1 to SSn to the display panel DP. Each of the scan signals SC1 to SCn and the initialization signals SS1 to SSn may have a high level for some sections and may have a low level for some sections. In this case, N-type transistors are turned on when corresponding signals have the high level, and P-type transistors are turned on when corresponding signals have the low level. Hereinafter, the pixel PXij including the N-type first, second, and third transistors T1, T2, and T3 shown in FIG. 4 will be described as a an illustrated embodiment.

When the i-th initialization signal SSi has the high level, the third transistor T3 may be turned on. When the third transistor T3 is turned on, the initialization voltage Vinit may be transmitted to the second reference node RN2 via the third transistor T3. Accordingly, the second reference node RN2 may be initialized to the initialization voltage Vinit, and the source electrode S1 of the first transistor T1 and the anode AN of the light-emitting diode OLED, which are electrically connected to the second reference node RN2, may be initialized to the initialization voltage Vinit.

When the i-th scan signal SCi has the high level, the second transistor T2 may be turned on. When the second transistor T2 is turned on, the data signal DS may be transmitted to the first reference node RN1 via the second transistor T2. Accordingly, the data signal DS may be applied to the gate electrode G1 of the first transistor T1 and the first electrode Cst1 of the capacitor Cst, which are electrically connected to the first reference node RN1. When the data signal DS is applied to the gate electrode G1 of the first transistor T1, the first transistor T1 may be turned on.

In an embodiment, a period during which the i-th initialization signal SSi has the high level may overlap a period during which the i-th scan signal SCi has the high level. In this case, the data signal DS and the initialization voltage Vinit may be applied to opposite ends of the capacitor Cst, and the capacitor Cst may be charged with electric charges corresponding to a voltage difference DS-Vinit between opposite ends thereof.

The second driving voltage ELVSS may be applied to the cathode CA of the light-emitting diode OLED. Accordingly, when the i-th initialization signal SSi has the high level and the initialization voltage Vinit having the voltage level lower than the voltage level of the second driving voltage ELVSS is applied to the anode AN of the light-emitting diode OLED, no current may flow through the light-emitting diode OLED.

When the i-th scan signal SCi has the low level, the second transistor T2 may be turned off. When the i-th initialization signal SSi has the low level, the third transistor T3 may be turned off. In an embodiment, a period during which the i-th scan signal SCi has the low level may overlap a period during which the i-th initialization signal SSi has the low level. Although the second transistor T2 is turned off in response to the i-th scan signal SCi having the low level, the first transistor T1 may maintain the turn-on state by the electric charges charged in the capacitor Cst. Accordingly, a driving current I_OLED may flow through the first transistor T1. Due to the driving current I_OLED flowing in through the first transistor T1, a voltage level of the anode AN of the light-emitting diode OLED may gradually increase. When the voltage level of the anode AN becomes higher than the voltage level of the cathode CA, the driving current I_OLED may flow to the light-emitting diode OLED, and the light-emitting diode OLED may emit a light. In this case, although the voltage level of the second reference node RN2 increases, the voltage level of the first reference node RN1 may increase due to a coupling effect of the capacitor Cst, and thus, a level of the driving current I_OLED flowing through the first transistor T1 may be maintained.

In an embodiment, according to a current-voltage relationship of the first transistor T1, the level of the driving current I_OLED may be proportional to the voltage level of the data signal DS applied to the gate electrode G1 of the first transistor T1 in a case where the voltage level of the first driving voltage ELVDD applied to the drain electrode D1 of the first transistor T1 is greater than a saturation voltage level of the first transistor T1. The saturation voltage level of the first transistor T1 may be a voltage level of a point at which the driving current I_OLED is uniformly maintained even when the level of the voltage applied to the drain electrode D1 of the first transistor T1 increases.

In a case where the voltage level of the first driving voltage ELVDD applied to the drain electrode D1 of the first transistor T1 is smaller than the saturation voltage level, the level of the driving current I_OLED flowing through the first transistor T1 may be determined by the voltage level of the first driving voltage ELVDD and the voltage level of the data signal DS.

Accordingly, although the data signal DS with the uniform voltage level is applied to the first transistor T1, the level of the driving current I_OLED may be changed depending on the voltage level of the first driving voltage ELVDD, and thus, an emission intensity of the light-emitting diode OLED may be changed.

In an embodiment, as the level of the voltage applied to the first transistor T1 serving as the driving transistor decreases, an emission brightness of the light-emitting diode OLED may increase, and the brightness of the pixel PXij may increase. The voltage applied to the first transistor T1 may correspond to a difference between the voltage applied to the gate electrode G1 and the voltage applied to the source electrode S1. That is, the level of the voltage applied to the first transistor T1 may be proportional to the level of the voltage of the data signal DS applied to the gate electrode G1. When the voltage of the data signal DS (hereinafter, also referred to as a data voltage) is low, the voltage of the first transistor T1 may be low, the light-emitting diode OLED may emit bright light, and the brightness of the pixel PXij may increase. That is, the level of the data voltage applied to the pixel PXij may be inversely proportional to the brightness of the pixel PXij.

Figure 5:
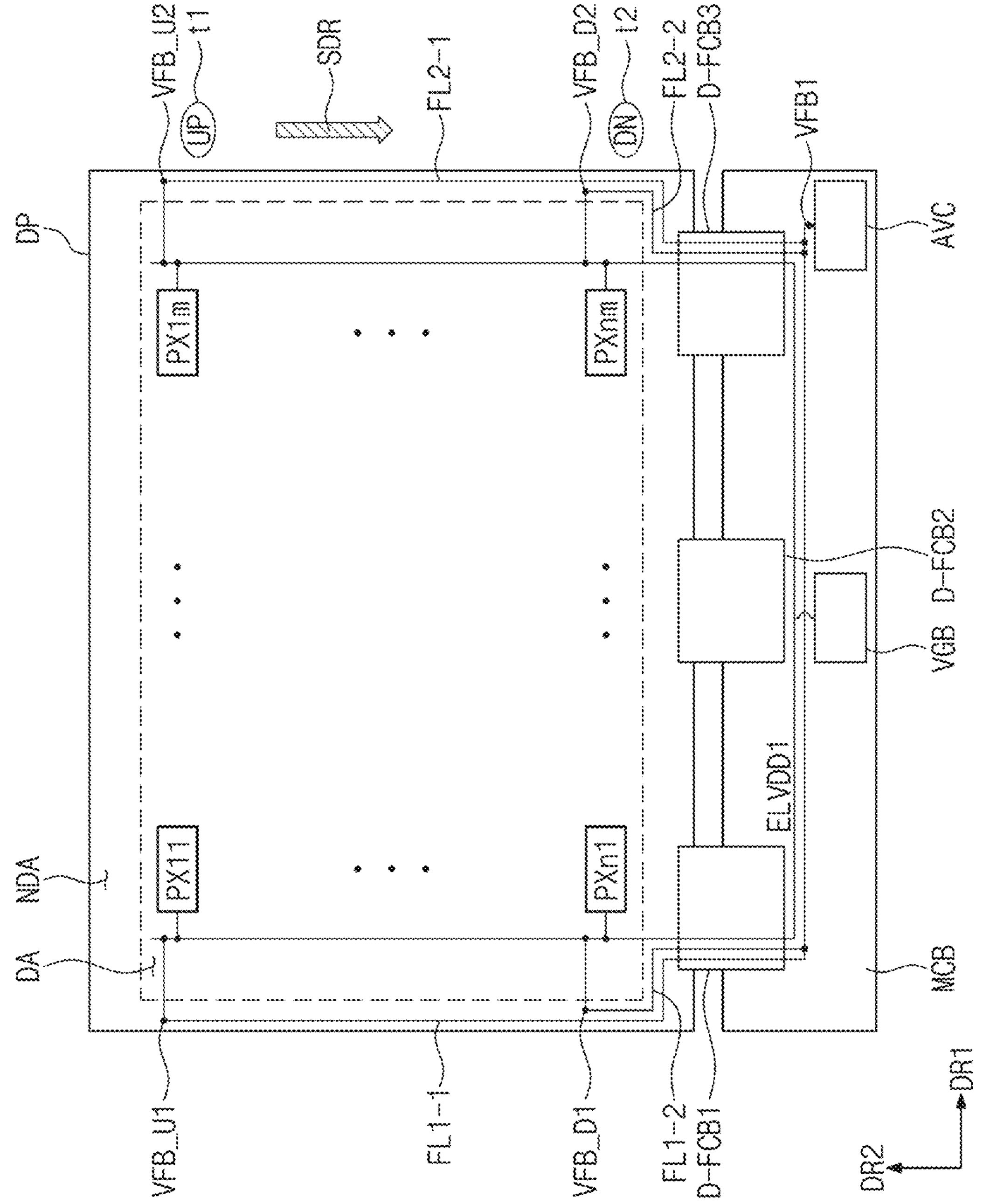
FIG. 5 is a plan view showing an embodiment of a display device according to the invention.

FIG. 5 is a plan view showing an embodiment of the display device according to the invention.

In an embodiment, the panel driver PDB (refer to FIG. 3) may be disposed on the main circuit board MCB. In an embodiment, the brightness compensator AVC may be disposed on the main circuit board MCB. The voltage generator VGB may be disposed on the main circuit board MCB.

Referring to FIG. 5, the display panel DP may include a plurality of upper pixels disposed at the upper side UP and arranged in the first direction DR1. The upper pixels may include a first upper pixel PX11 and a second upper pixel PX1*m*. Among the upper pixels, the first upper pixel PX11 may be disposed farthest from the second upper pixel PX1*m* in the first direction DR1.

The display panel DP may include a plurality of lower pixels disposed at the lower side DN and arranged in the first direction DR1. The lower pixels may include a first lower pixel PXn1 and a second lower pixel PXnm. Among the lower pixels, the first lower pixel PXn1 may be disposed farthest from the second lower pixel PXnm in the first direction DR1. In the illustrated embodiment, the upper side UP may correspond to one side of the display panel DP, which is farthest from the main circuit board MCB in the second direction DR2, and the lower side DN may correspond to the other side of the display panel DP, which is nearest to the main circuit board MCB in the second direction DR2.

In FIG. 5, the voltage generator VGB may be disposed on the main circuit board MCB to be closer to the lower pixels PXn1 to PXnm of the display panel DP and to be farther from the upper pixels PX11 to PX1*m* of the display panel DP. The voltage generator VGB may apply the first driving voltage (also referred to as an initial driving voltage) ELVDD1 to the upper pixels PX11 to PX1*m* via the lower pixels PXn1 to PXnm of the display panel DP.

A plurality of sensing lines FL1-1, FL1-2, FL2-1, and FL2-2 may be disposed on the display panel DP and the main circuit board MCB. The sensing lines FL1-1, FL1-2, FL2-1, and FL2-2 may include a first upper sensing line FL1-1 connected to the first upper pixel PX11, a second upper sensing line FL2-1 connected to the second upper pixel PX1*m*, a first lower sensing line FL1-2 connected to the first lower pixel PXn1, and a second lower sensing line FL2-2 connected to the second lower pixel PXnm among the pixels PX11 to PXnm.

The sensing lines FL1-1, FL1-2, FL2-1, and FL2-2 may sense a feedback voltage VFB1. The sensing lines FL1-1, FL1-2, FL2-1, and FL2-2 may sense the feedback voltage VFB1 from the display panel DP and may apply the feedback voltage VFB1 to the brightness compensator AVC. The pixels may be disposed in the display area DA, and the sensing lines FL1-1, FL1-2, FL2-1, and FL2-2 may be disposed in the non-display area NDA.

The sensing lines FL1-1, FL1-2, FL2-1, and FL2-2 may be connected to the brightness compensator AVC on the main circuit board MCB via the first and third flexible circuit films D-FCB1 and D-FCB3.

The feedback voltage VFB1 may correspond to a variation of the initial driving voltage ELVDD1 applied to the display panel DP at each pixel position. The feedback voltage VFB1 may be provided as a plurality of voltages. In an embodiment, the feedback voltage VFB1 may include a first upper feedback voltage VFB_U1 sensed via the first upper sensing line FL1-1, a second upper feedback voltage VFB_U2 sensed via the second upper sensing line FL2-1, a first lower feedback voltage VFB_D1 sensed via the first lower sensing line FL1-2, and a second lower feedback voltage VFB_D2 sensed via the second lower sensing line FL2-2.

According to FIG. 5, a scan direction SDR may proceed from the upper side UP to the lower side DN of the display panel DP.

Figure 6:
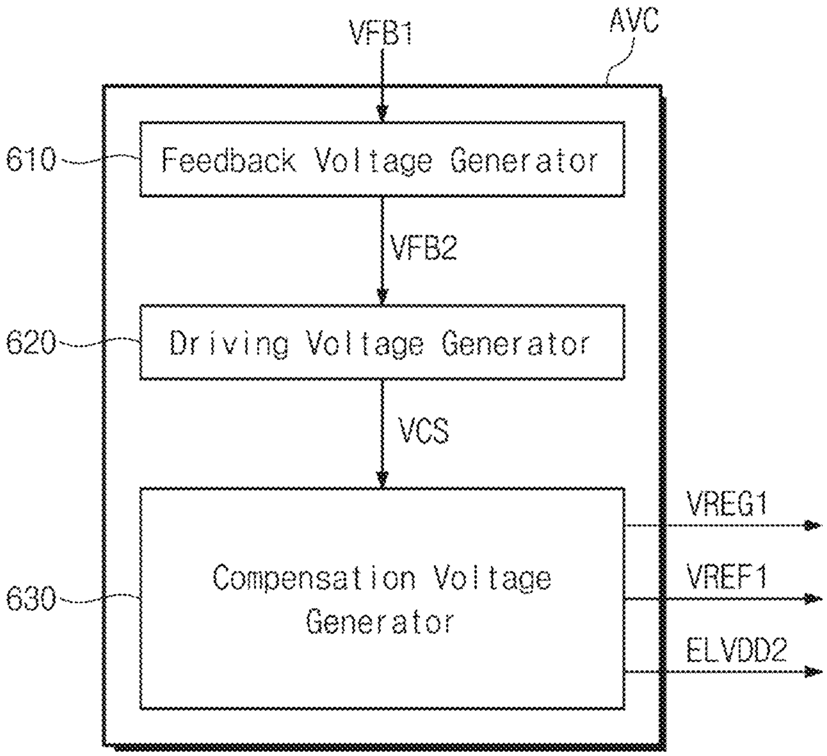
FIG. 6 is a block diagram showing an embodiment of a brightness compensator according to the invention.
Figure 7:
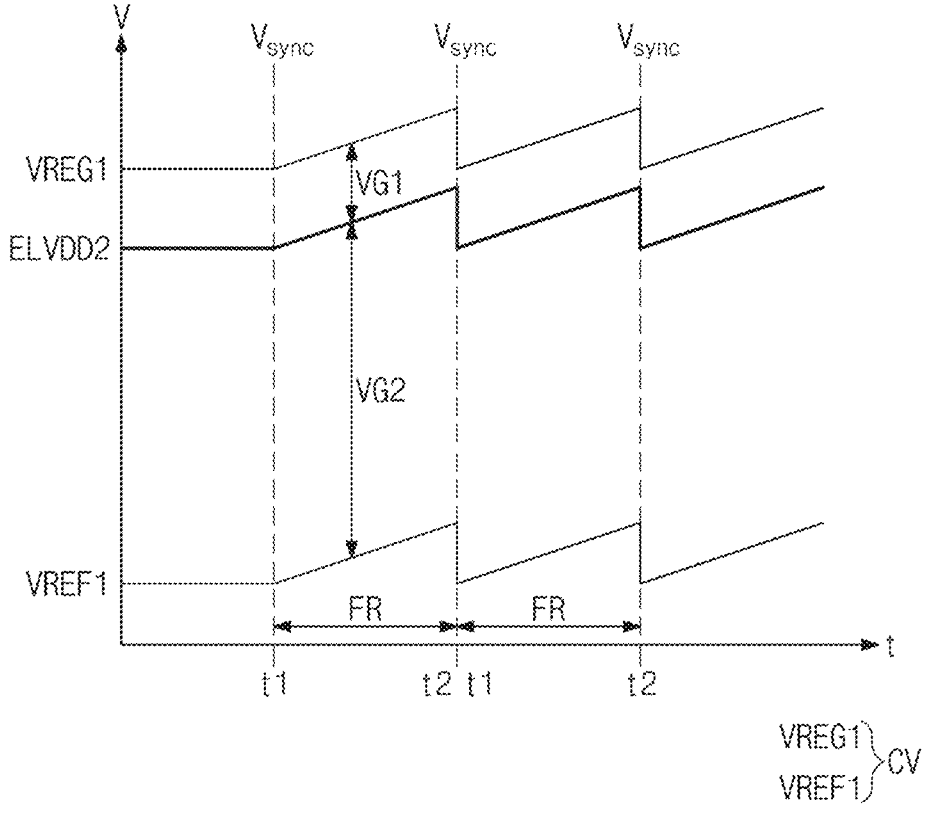
FIG. 7 is a graph showing an embodiment of a compensation voltage according to the invention.
Figure 8:
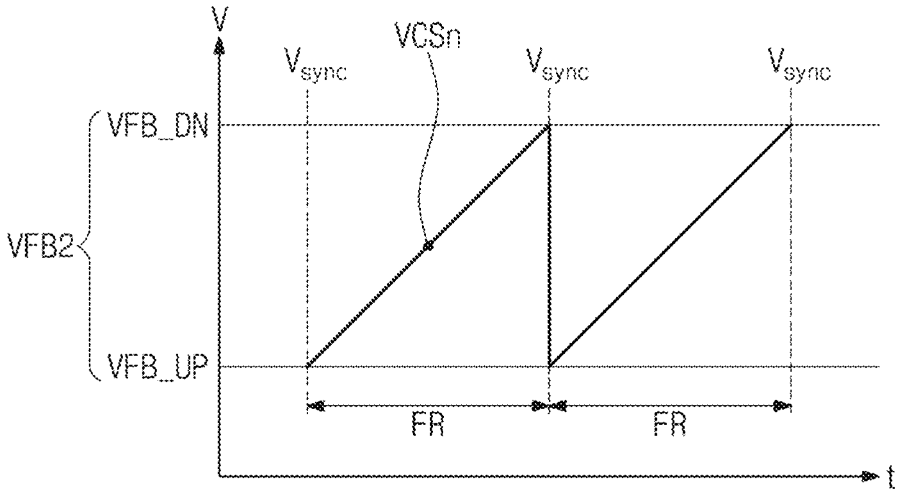
FIG. 8 is a graph showing an embodiment of a driving voltage according to the invention.

FIG. 6 is a block diagram showing an embodiment of the brightness compensator AVC according to the invention. FIG. 7 is a graph showing a compensation voltage according to the invention. FIG. 8 is a graph showing a driving voltage according to the invention.

The brightness compensator AVC may receive the feedback voltage VFB1 including the first upper feedback voltage VFB_U1, the second upper feedback voltage VFB_U2, the first lower feedback voltage VFB_D1, and the second lower feedback voltage VFB_D2 and may generate a driving voltage ELVDD2 based on the feedback voltage VFB1. The brightness compensator AVC may generate compensation voltages VREG1 and VREF1 (refer to FIG. 3) based on the driving voltage ELVDD2 and may apply the compensation voltages VREG1 and VREF1 to the display panel.

Referring to FIG. 6, the brightness compensator AVC may include a feedback voltage generator 610, a driving voltage generator 620, and a compensation voltage generator 630.

The feedback voltage generator 610 may calculate an average feedback voltage VFB2 based on the feedback voltages VFB1. In an embodiment, the feedback voltage generator 610 may calculate an average of the first upper feedback voltage VFB_U1 and the second upper feedback voltage VFB_U2 and may generate an upper average feedback voltage VFB_UP (refer to FIG. 8).

The feedback voltage generator 610 may calculate an average of the first lower feedback voltage VFB_D1 and the second lower feedback voltage VFB_D2 and may generate a lower average feedback voltage VFB_DN (refer to FIG. 8). Due to the IR drop, a level of the lower average feedback voltage VFB_DN may be greater than a level of the upper average feedback voltage VFB_UP.

Referring to FIG. 8 along with FIG. 6, the driving voltage generator 620 may calculate a driving voltage VCS based on a difference between the upper average feedback voltage VFB_UP and the lower average feedback voltage VFB_DN. The driving voltage VCS may be linearly changed between the upper average feedback voltage VFB_UP and the lower average feedback voltage VFB_DN in one frame. In an embodiment, the driving voltage VCS may include plural driving voltages VCS respectively correspond to the first to n-th scan lines. In the one frame, a level of a first driving voltage corresponding to the first scan line disposed at an upper side of the display panel may be smaller than a level of a last driving voltage corresponding to the last scan line disposed at a lower side of the display panel.

The driving voltage generator 620 may calculate the driving voltages VCS that increase linearly from the upper side to the lower side of the display panel within the one frame. In an embodiment, the driving voltages VCS may gradually increase along the scan direction SDR toward the lower side DN from the upper side UP of the display panel.

Among the driving voltages VCS, a level of a driving voltage VCSn corresponding to the n-th scan line may be calculated by the following Equation.

$$VCS_n = VFB_{UP} + \frac{VFB_{DN} - VFB_{UP}}{V_{total}} \times V_n \quad \text{Equation}$$

In Equation, VCSn denotes the driving voltage of the n-th scan line, VFBup denotes the upper average feedback voltage, VFBdn denotes the lower average feedback voltage, Vtotal denotes a total voltage applied to the scan lines, and Vn denotes a voltage applied to the n-th scan line.

Referring to FIG. 7, the compensation voltage generator 630 may generate a compensation driving voltage ELVDD2 and the compensation voltages VREG1 and VREF1 based on the driving voltages VCS.

The compensation driving voltage ELVDD2 may include a plurality of driving voltages VCS that is linearly changed. That is, the compensation driving voltage ELVDD2 may be a concept encompassing the plural driving voltages VCS that linearly increase from the upper side to the lower side of the display panel at each frame FR and may be also referred to as a plurality of driving voltages ELVDD2 or the driving voltage ELVDD2.

The compensation voltage generator 630 may generate the compensation voltages VREG1 and VREF1 that proportionally increase or decrease with constant voltage gaps VG1 and VG2 with respect to the driving voltage ELVDD2.

The compensation voltage CV may be changed as the driving voltage ELVDD2 is changed. The compensation voltage CV may correspond to a gamma reference voltage, e.g., a black gamma reference voltage VREG1 or a white gamma reference voltage VREF1. The compensation voltage CV may be applied to the pixels of the display panel DP. That is, a level of the compensation voltage CV applied to the upper pixels of the display panel DP may be smaller than a level of the compensation voltage CV applied to the lower pixels of the display panel DP.

The compensation voltage CV may be also referred to as compensation voltages VREG1 and VREF1. The level of the compensation voltage CV may be inversely proportional to the brightness of the pixel. According to the display device DD, the level of the compensation voltage CV applied to the upper pixels may be smaller than the level of the compensation voltage applied to the lower pixels, and thus, the brightness difference between the upper and lower sides of the display panel DP may be reduced.

Referring to FIG. 7, the driving voltage ELVDD2 and the compensation voltage CV may have a value that is linearly changed in each frame FR. The change of each of the driving voltage ELVDD2 and the compensation voltage CV may be repeated in every frame FR. That is, the increase in voltage during one frame from a first scan period t1 in which the upper pixels PX11 to PX1*m* are scanned to a second scan period t2 in which the lower pixels PXn1 to PXnm are scanned may be repeated in every frame FR.

Figure 9:
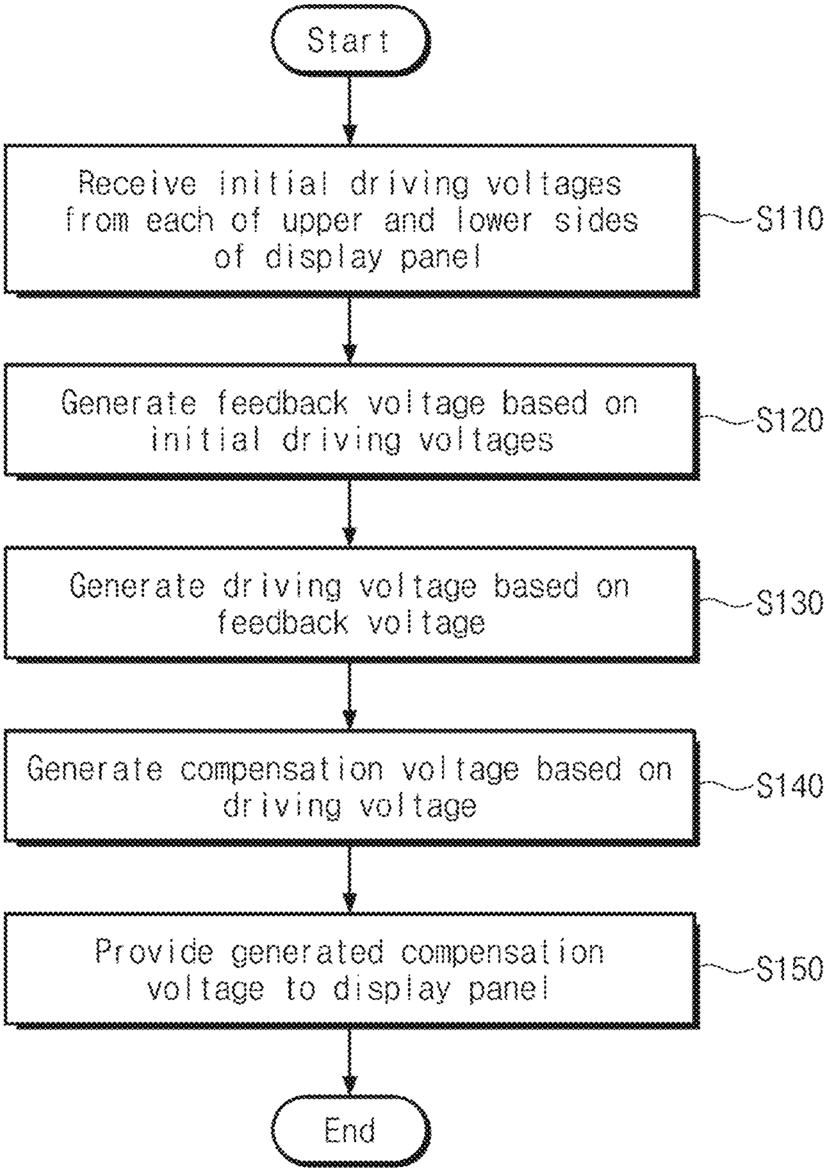
FIG. 9 is a flowchart showing an embodiment of a method of driving a display device according to the invention.

FIG. 9 is a flowchart showing an embodiment of a method of driving a display device according to the invention. FIG. 9 shows a method of compensating for the brightness difference between the upper and lower sides of the display panel using the brightness compensator AVC. The compensating method will be described with reference to FIGS. 5 to 7 and 9.

Referring to FIG. 9, the brightness compensator AVC of the panel driver PDB may receive the initial driving voltage ELVDD1 from each of the upper side UP and the lower side DN of the display panel DP (S110).

The feedback voltage generator 610 may generate the feedback voltage VFB1 based on the initial driving voltages ELVDD1 (S120).

The driving voltage generator 620 may calculate the average feedback voltage VFB2 based on the feedback voltage VFB1 and may generate the driving voltage VCS based on the average feedback voltage VFB2 (S130).

The compensation voltage generator 630 may generate the compensation voltage CV based on the driving voltage VCS (S140). In an embodiment, the compensation voltage generator 630 may generate the compensation driving voltage ELVDD2 including the driving voltages VCS and may generate the compensation voltage CV that increases or decreases proportionally with the constant gaps VG1 and VG2 with respect to the compensation driving voltage ELVDD2.

The brightness compensator AVC may apply the compensation voltage CV to the pixels of the display panel DP from the upper pixels PX11 to PX1*m* to the lower pixels PXn1 to PXnm (S150).

Figure 10:
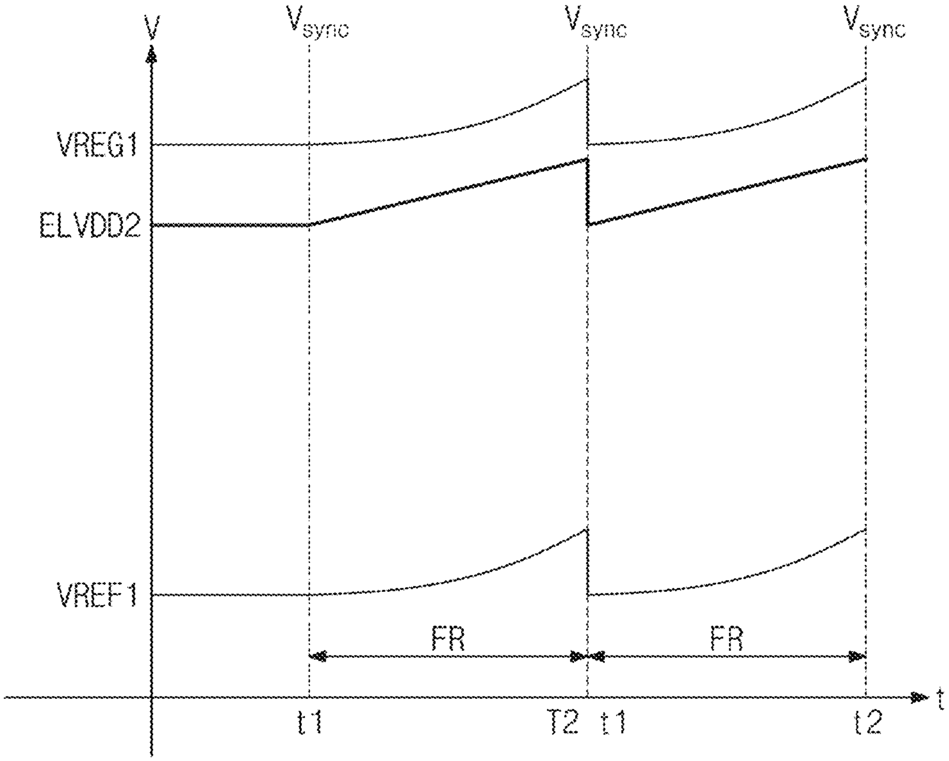
FIG. 10 is a graph showing an embodiment of a compensation voltage according to the invention.
Figure 11:
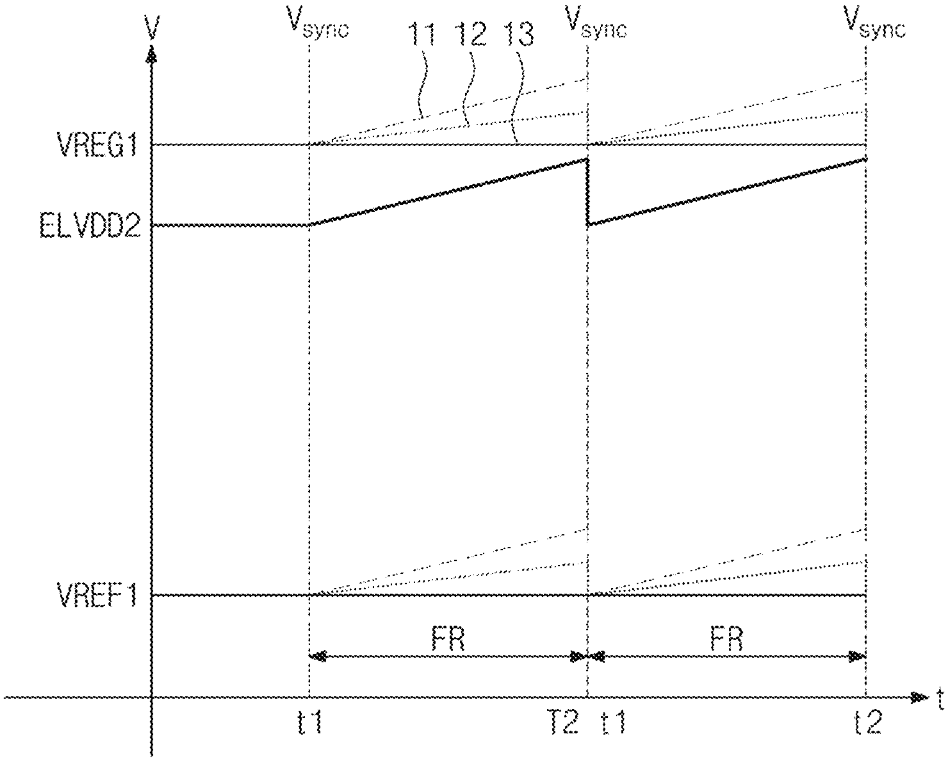
FIG. 11 is a graph showing an embodiment of a compensation voltage according to the invention.

FIG. 10 is a graph showing a compensation voltage according to the invention. FIG. 11 is a graph showing a compensation voltage according to the invention.

Referring to FIG. 10, compensation voltages VREG1 and VREF1 may increase as a driving voltage ELVDD2 increases in each frame FR, however, the compensation voltages VREG1 and VREF1 may not linearly increase. That is, even though the driving voltage ELVDD2 linearly increases, the compensation voltages VREG1 and VREF1 may increase non-linearly according to characteristics of the display panel.

Referring to FIG. 11, compensation voltages VREG1 and VREF1 (hereinafter, also referred to as a compensation voltage CV) may increase with a slope different from that of a driving voltage ELVDD2. In this case, the compensation voltage CV may increase linearly. In an embodiment, the compensation voltage CV may increase linearly with first, second, and third slopes 11, 12, and 13.

In an embodiment, in a case where a scan voltage applied to the n-th scan line is multiplied by 0.5 in the following Equation (that is, a scan voltage applied to each scan line is multiplied by 0.5), the compensation voltage CV may increase with the second slope 12. In a case where the scan voltage applied to the n-th scan line is multiplied by 0, the compensation voltage CV may have the third slope 13. That is, the compensation voltage CV may not increase. In a case where the scan voltage applied to the n-th scan line is multiplied by 1, the compensation voltage CV may increase with the first slope 11 that is the same as that of the driving voltage ELVDD2.

$$VCS_n = VFB_{UP} + \frac{VFB_{DN} - VFB_{UP}}{V_{total}} \times V_n \qquad \text{Equation}$$

Although the embodiments of the invention have been described, it is understood that the invention should not be limited to these embodiments but various changes and modifications may be made by one ordinary skilled in the art within the spirit and scope of the invention as hereinafter claimed.

Therefore, the disclosed subject matter should not be limited to any single embodiment described herein, and the scope of the invention shall be determined according to the attached claims.

What is claimed is:

1. A display device comprising:

a display panel comprising a plurality of pixels which display an image;

a panel driver which generates a driving voltage based on a plurality of feedback voltages sensed from the display panel and drives the display panel; and a plurality of sensing lines which are connected to the plurality of pixels to sense the plurality of feedback voltages, respectively, and apply the plurality of feedback voltages to the panel driver, wherein the panel driver generates an average feedback voltage corresponding to an average of the plurality of feedback voltages respectively corresponding to the plurality of sensing lines and generates the driving voltage based on the average feedback voltage, the plurality of pixels comprises a plurality of upper pixels and a plurality of lower pixels, the average feedback voltage comprises:

an upper average feedback voltage corresponding to an average of feedback voltages of the plurality of upper pixels, respectively; and a lower average feedback voltage corresponding to an average of feedback voltages of the plurality of lower pixels, respectively, and the driving voltage is generated based on a difference between the upper average feedback voltage and the lower average feedback voltage.

2. The display device of claim 1, wherein the panel driver comprises:

a controller which generates a source control signal and a gate control signal and generates image data based on an image signal applied thereto from an outside;

a data driver which receives the image data and the source control signal, generates a data signal based on the image data, and applies the data signal to the display panel; and a scan driver which comprises a plurality of scan lines, generates a scan signal based on the gate control signal, and sequentially transmits the scan signal to the display panel via the plurality of scan lines.

3. The display device of claim 2, wherein the plurality of lower pixels is closer to the panel driver than the plurality of upper pixels is to the panel driver; and the plurality of sensing lines comprises:

a plurality of upper sensing lines connected to the plurality of upper pixels; and a plurality of lower sensing lines connected to the plurality of lower pixels.

4. The display device of claim 3, wherein the plurality of upper pixels comprises:

a first upper pixel; and a second upper pixel disposed farthest from the first upper pixel in a first direction, the plurality of lower pixels comprises:

a first lower pixel; and a second lower pixel disposed farthest from the first lower pixel in the first direction, the plurality of upper sensing lines comprises:

a first upper sensing line connected to the first upper pixel; and a second upper sensing line connected to the second upper pixel, and the plurality of lower sensing lines comprises:

a first lower sensing line connected to the first lower pixel; and a second lower sensing line connected to the second lower pixel.

5. The display device of claim 4, wherein the plurality of feedback voltages comprises:

a first upper feedback voltage sensed from the first upper sensing line;

a second upper feedback voltage sensed from the second upper sensing line;

a first lower feedback voltage sensed from the first lower sensing line; and a second lower feedback voltage sensed from the second lower sensing line.

6. The display device of claim 5, the upper average feedback voltage of corresponds to an average of the first upper feedback voltage and the second upper feedback voltage; and the lower average feedback voltage corresponds to an average of the first lower feedback voltage and the second lower feedback voltage.

7. The display device of claim 6, wherein the driving voltage increases linearly between the upper average feedback voltage and the lower average feedback voltage along a scan direction of the scan signal proceeding from the plurality of upper pixels to the plurality of lower pixels with respect to one frame.

8. The display device of claim 7, wherein the panel driver further comprises a brightness compensator, and the brightness compensator comprises:

a feedback voltage generator which calculates an average of the plurality of feedback voltages from the plurality of sensing lines and generates the average feedback voltage; and a driving voltage generator which generates the driving voltage based on the average feedback voltage.

9. The display device of claim 8, wherein the brightness compensator further comprises: a compensation voltage generator, and the compensation voltage generator generates the compensation voltage based on the generated driving voltage and applies the compensation voltage to the display panel.

10. The display device of claim 9, wherein the compensation voltage is linearly changed with a constant gap with respect to the driving voltage in response to the scan signal.

11. The display device of claim 6, wherein a driving voltage of an n-th scan line among the plurality of scan lines is determined by a following Equation:

$$VCS_n = VFB_{UP} + \frac{VFB_{DN} - VFB_{UP}}{V_{total}} \times V_n,$$

where VCSn denotes the driving voltage of the n-th scan line, VFBup denotes the upper average feedback voltage, VFBdn denotes the lower average feedback voltage, Vtotal denotes a total voltage applied to the plurality of scan lines, and Vn denotes a voltage applied to the n-th scan line.

12. The display device of claim 1, wherein the driving voltage applied to the display panel decreases linearly from a lower side of the display panel to an upper side of the display panel, and the lower side of the display panel is closer to the panel driver than the upper side of the display panel is to the panel driver.

13. The display device of claim 3, wherein the driving voltage applied to the plurality of lower pixels of the display panel is greater than the driving voltage applied to the plurality of upper pixels of the display panel.

* * * * *